Patented Oct. 3, 1950

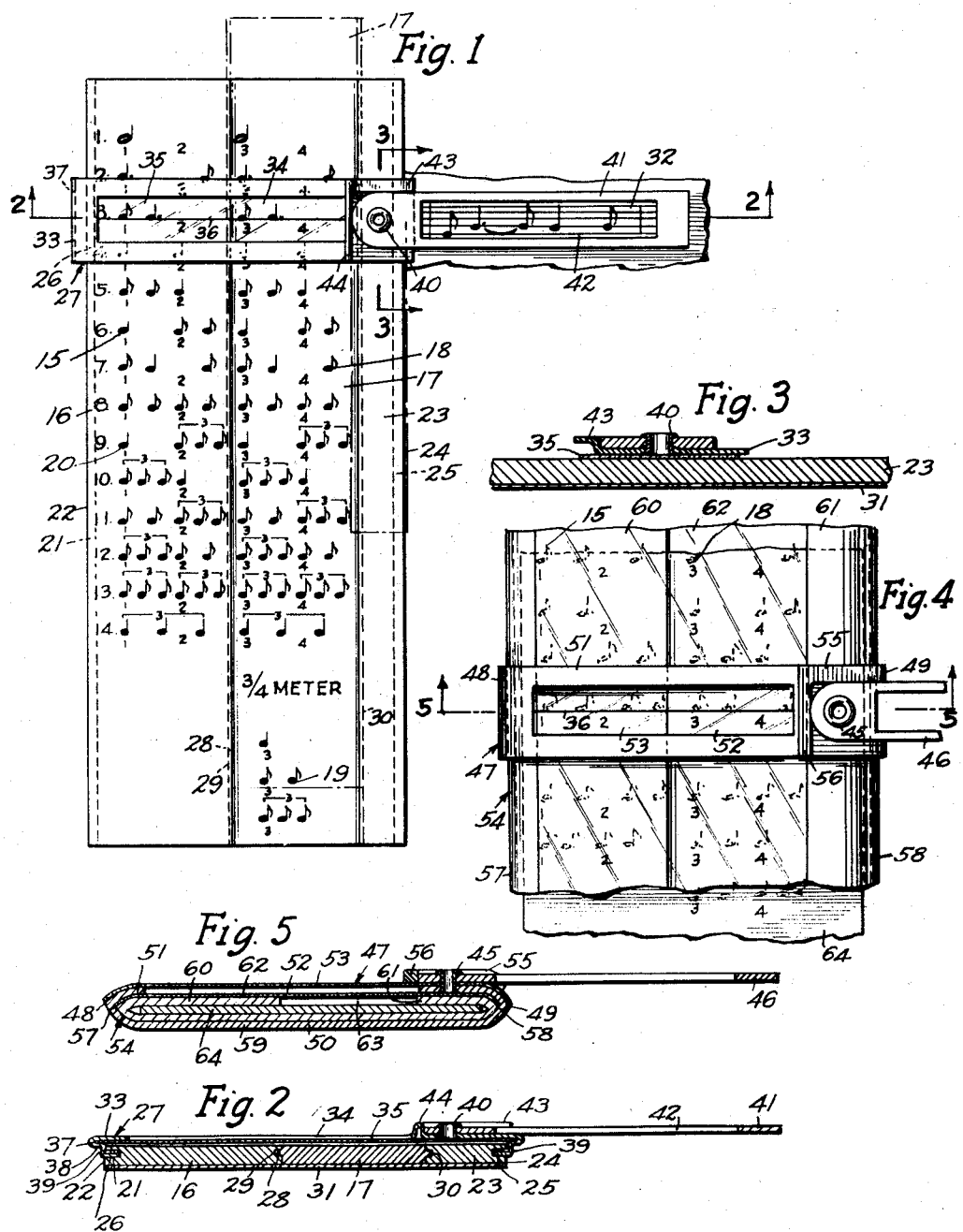

2,524,736

UNITED STATES PATENT OFFICE 2,524,736

RHYTHM SELECTOR

Louis A. Ruben, Bayonne, N. J., assignor to Leonard Greene, New York, N. Y.

Application November 3, 1949, Serial No. 125,197

17 Claims. (Cl. 84—484)

This invention relates to aids in the teaching of music and particularly to a device for determining the location of the beats in a measure of "popular" or other music.

Ever since keyboard instruments came into general use, some players improvised and played in a free style. That is, they used the melody originated by the composer, but from their knowledge of chords and chord progression, they have been able to create a piano part as distinguished from the more difficult playing method of reading the piano part in its entirety. Any pianist familiar with the terminology of chord names and symbols and knowing how to play such chords, need only look at a melody line to play a composition on the piano. Assuming that a student is able to play a melodic line from a sheet of music, the first principle he is taught in order to enable him to create a piano part, is the so-called "swing bass." This means that if the chord symbol above the melody is C, then for 3/4 meter the left hand strikes a C octave and follows with two C chords. In common or fox trot (4/4) meter, an octave is struck on the first beat, a chord on the second, an octave on the third and another chord on the fourth beat. So without having to look at or read the bass clef, but simply by looking at the chord symbol above the melody, the player creates an artificial bass which is based on the correct harmony of the song or other piece.

It will be understood that the swing bass consists of either three or four striking operations for the left hand, three for a waltz and four for a fox trot, the succession for the latter being octave, chord, octave, chord, and consisting of four quarter notes. A primary difficulty in teaching the piano, and perhaps other instruments as well, has been the problem of teaching rhythmic values. While the number of beats in a measure is constant for any given meter signature, like a pulse beat or the tick of a watch, the rhythm of a melody is constantly changing. This leads to the difficulty on the part of students in coordinating the playing of both hands, and the difficulty on the part of the teacher in teaching how to attain such coordination. The usual method for working out a problem in rhythm is to have the student count, four counts for a whole note, three for a dotted half, two for a half and one for a quarter. While this method is adequate for undivided beats and for measures containing nothing below a quarter note, it is totally unsuited for more complex rhythms. When the student encounters groups of notes such as dotted eighths and sixteenths, triplets and particularly syncopated rhythms, the counting method fails completely. The student's ability to read the pitch names of a new composition does not help him to determine the rhythmic patterns, or to locate the beats in their proper places.

The present invention therefore contemplates the provision of a simple and easily manipulated indicator including a slide and a fixed member each bearing musical notations arranged in a column and indicating the more common rhythms of popular music, whereby the particular rhythm of any ordinary measure may be matched on the indicator, the aforesaid notations including indications of the location of the beats in the selected measure, so that the user is apprised of such location and consequently is enabled to "beat out" the music in the proper rhythm with a properly coordinated swing bass.

The invention further contemplates the provision of a slide device having a relatively fixed column of notations for the more common rhythms of part of a measure and a relatively movable column for the remaining part of the measure, the locations of the beats being marked in each part measure, whereby the respective rhythms of most measures can be ascertained by moving the slide to juxtaposition the proper fractional parts of the measures.

The invention further contemplates the provision of an economical and effective beat locating device wherein any selected one of the more common rhythmic notations, marked with indicia locating the position of the beats in the left hand part of a measure of music, may be aligned with any selected one of the similar remaining partial rhythmic notations in the right hand part of the measure to determine the otherwise unknown location of the beats in the full measure.

The invention further contemplates the provision of a window and a guide line on a member slidable on the fixed part of a rhythm selector of the type above referred to, whereby not only may the parts of a rhythmic notation of a measure be aligned to correspond to the musical notations of any measure, but the measure being investigated may be readily aligned with the corresponding notations on the selecting device for easy comparison.

The various objects of the invention will be clear from the description which follows and from the drawings, in which Fig. 1 is an elevational view of the beat selector provided with a fixed column and a movable column of musical notations applicable to 4/4 meter and to 3/4 meter, showing in dash-dot lines how the slide and the pivoted window carrying member may be moved to various positions.

Fig. 2 is a horizontal section of the indicator or selector taken on the line 2—2 of Fig. 1.

Fig. 3 is a vertical sectional view of the selector taken on the line 3—3 of Fig. 1.

Fig. 4 is an elevational view of part of a modified form of the selector as it appears when made of inexpensive sheet material such as cardboard.

Fig. 5 is a horizontal sectional view thereof taken on the line 5—5 of Fig. 4.

For purposes of illustration, I have shown a selector in the form of a slide rule in which a set 15 of musical notations having two beats, constituting a half measure in fox trot meter and two thirds of a measure in waltz meter, are arranged on a relatively fixed part 16 of the rule, while a movable slide 17 bears a duplicate set 18 of such notations. The set 18 constitutes the other two beats of the measure for fox trot meter, the slide 17 also carrying a set of notations 19 for the single remaining beat of the waltz meter. The first eight of the notations 15 and 18 identified by the numerals from "1" to "8" inclusive arranged in a vertical column constitute the basic rhythmic patterns used in music today, to which may be added the triplets as in the remaining notations of the set 15 marked from "9" to "14" inclusive. Additional and more rare rhythmic patterns not shown may include dotted eighth and sixteenth notes and obviously, such notation patterns may be added to the column if desired.

The notes of the sets 15 and 18 are arranged insofar as possible in vertical columns. Since the first note 20 of any measure is always at the first beat, the numeral "1" is placed underneath such first note. The second beat may come at a note as in notation "6" or in between notes as in notation "7," depending on the duration of and the resulting number of notes in the half measure. Whether a note is present or not at the second beat, the numerals "2" indicating said beat, are arranged in a vertical column as are the sets of numerals "3" and "4" which indicate respectively, the third and fourth beats of the measure.

As shown in Figs. 1–3, the slide rule may take the form of the relatively fixed notation-carrying part 16 having a groove 21 along its outer edge 22 and being secured in transverse spaced relation, as by the backing member 31, to the other and unmarked fixed part 23. In the outer edge 24 of said part 23 is made the longitudinal groove 25 similar to the groove 21, said grooves respectively receiving and guiding one of the doubled over edge portions 26 of the sliding indicator 27 soon to be described in detail. The slide 17 is provided with a tongue 28 on each longitudinal edge thereof, one of which tongues is slidably fitted into a corresponding longitudinal edge groove 29 in the inner edge of the fixed part 16 and the other being similarly fitted into a similar groove 30 in the inner edge of the part 23. The slide 17 may therefore be moved vertically with respect to the parts 16 and 23 to bring any selected one of the notations on said part 16 alongside any one of the line of notations on the slide, thereby to match the notations for any measure as 32 of a musical composition on a sheet or in a book.

For simplifying the operation of aligning the selected notations of the sets 15 and 18 horizontally with the measure 32 for comparison with said measure in order to determine the location of the beats therein, the indicator 27 is slidably mounted on the fixed parts 16 and 23. In the form illustrated, said indicator comprises a preferably metallic sheet member 33 provided with an opening 34 therein through which only a single horizontal line of notations are visible at any time. The opening is covered with a sheet 35 of suitable transparent material such as cellophane, having the transverse guide line 36 thereon. The side edges of the sheet may be inserted into and held in the grooves 37 on the ends of the indicator, each of said grooves being formed by the 180° bend constituting the side edge of the member 33. The bottom 38 of the groove 37 serves as a support for the edge of the sheet 35. The edge portion of the sheet 33 is bent perpendicularly to the bottom 38 as best seen in Fig. 2 to form the side flange 39 and then bent again parallel to the top of the member to form the doubled back edge portion or tongue 26 which is preferably slidably mounted in the groove 21 or 25. It will thus be seen that the line 36 may be brought to indicate any of the lines of rhythmic notations "1" to "14" by merely sliding the indicator 27 in the grooves 21 and 25 along the fixed parts 16 and 23.

Pivotally secured to the member 33 of the indicator at one end thereof as by means of the eyelet 40, is the elongated arm 41 having the window opening 42 therein. When not in use, the arm is readily foldable to the inoperative position thereof shown in dash-dot lines in Fig. 1. When extended to the position shown by the full lines of Fig. 1, the window 42 is preferably in horizontal alignment with the window opening 34 of the sliding indicator 27, whereby the arm 41 may be placed on a sheet of music or on a book with the window 42 at the measure to be investigated, and the slide rule then manipulated to carry the matching notations on the fixed and movable parts of the rule to the indicating line 36. As shown in Fig. 1, the first two notes constituting the left hand half of the measure 32 are an eighth and a dotted quarter. Such two notes are found on line "3" of the fixed part 16, which line is brought to the line 36 by sliding the rule relatively to the indicator 27 to the position shown. The right hand half of the measure 32 consists of an eighth note followed by a quarter and another eighth. Such rhythmic notation is found on the seventh line of the slide 17, which is moved to carry such seventh line to the indicator line 36. The measure 32 is thus matched on the rule, which now indicates by the numerals "1," "2," "3" and "4" beneath the notes that the first beat with a left hand octave base comes on the first note, the second beat with a left hand chord comes after the second note has been struck, the third beat with another left hand octave comes on the third note and the fourth beat with a left hand chord comes after the fourth note has been struck. The coordination of the playing of the hands, is thus converted for the student, from a mysterious and confusing operation to a simple one.

To prevent the arm 41 from swinging undesirably out of its proper position during the extending and folding operations thereon, suitable stops 43 and 44 are provided near the end of the sheet member 33. As best seen in Fig. 3, the stop 43 is formed by raising an edge portion of the member 33 above the remainder of said member into a position wherein the inner edge of the stop is in alignment with and engages the adjacent side edge of the extended indicator arm 41. Similarly, the transverse upstanding bead 44 forms the stop engaging the opposite side edge of the folded arm to prevent it from moving too far inwardly.

In Figs. 4 and 5, is shown an economical form of the invention made entirely from inexpensive material such as paper cardboard and plastic sheet except for the eyelet pivot 45 which pivots the indicator arm 46 to the sliding indicator 47 and passes through the top 51 of the indicator. Said indicator is folded from a sheet of paper or the like at the side score lines 48 and 49 to form the imperforate bottom 50 and the top 51 having the window opening 52 therein through which can be seen any selected line of rhythmic notations on the fixed and movable parts of the slide rule. The notations having already been described, such description need not be repeated. The edges of the folded sheet are held together by the transparent sheet 53 of cellophane or the like covering the opening as well as the abutting edges of said sheet and adhesively secured thereto, thereby forming a short tube or sleeve adapted to encompass and to slide on the tube or sleeve 54 forming the fixed part of the rule. A guide line 36 is made across the sheet 53. Stops similar in action to the stops 43 and 44 are inexpensively provided by securing, as by adhesive, a relatively thick piece of paper or the like in the form of an inverted L around the eyelet pivot 45 for the indicator arm and on top of the sheet 53. The top horizontal leg 55 forms the stop for the extended position of the arm and the upright leg 56 forms the stop for the folded position of the arm.

The relatively fixed part 54 of the slide rule, as has been indicated, is made in the form of a tube or sleeve similarly to the sliding indicator 47 by folding a sheet of relatively stiff paper along edge score line as 57, 58 to form a bottom 59 and two top spaced apart parallel flanges 60 and 61. Said flanges are covered and secured together in transverse spaced relation by the transparent sheet 62 of cellophane or the like to provide the longitudinal opening 63 therebetween. The notations 15 on the flange 60 are visible through the sheet 62, while the set 18 of notations on the slide 64 are also visible through said sheet. Said slide 64 comprises a flat sheet of suitable stiff paper such as cardboard slidably inserted within the tube 54 and slightly longer than said tube so that it may be gripped by the fingers and manipulated to carry any line of the notations 18 thereon to the indicator line 36 on the sheet 53, thereby to match the rhythmic notes or pattern of any measure as 32, of which the beats are unknown or to be determined.

It will be understood that while the invention has been described primarily in connection with fox trot meter, it is equally applicable to 3/4 meter or any other meter signature, necessitating only the printing of the proper half or other fractional part of the measures in the various possible rhythmic patterns on the fixed and movable parts of the slide rule. As shown in Fig. 1, the lowermost notations on the slide 17 are limited to the right hand third of a measure, indicating the third or last beat only in 3/4 meter, the first and second beats and corresponding notations for the left hand two thirds of the measure being the same as for a half measure in fox trot meter.

It will further be understood that while the invention is designed primarily for use in solving the problem of determining the rhythm of light music in the popular and semi-classical fields, it is also applicable in the teaching of rhythmic values and how to read at sight any phase or type of music, because the student is taught to look at groups of notes thereby acquiring the faculty of hearing rhythmic sounds on the presentation of a pictured group notation, instead of attempting to count subdivided and syncopated beats with resulting confusion.

It will also be understood that I have provided a simple device adapted for economical manufacture and requiring little if any skill to manipulate, for determining the location of the beats in a measure whereby the playing of the required octaves and chords by the left hand in coordination with the playing of the right hand is greatly facilitated and confusion eliminated.

While certain forms of the invention have herein been shown and described, various changes may obviously be made therein without departing from the spirit of the invention defined in the appended claims.

I claim:

1. A slide rule for determining the location of the beats in a measure of music comprising a relatively fixed part, a plurality of parallel lines of musical notations on said fixed part, each of said notations comprising a rhythmic pattern for a fraction of a measure, the numeral "1" under the first note of said notation, the numeral "2" at that point of the notation where the second beat occurs, the notes of said notations located at the same corresponding beats being arranged in respective vertical columns, a slide slidably supported relatively to the fixed part and carrying lines of musical notations comprising rhythmic patterns for the remaining fractional part of the measure, and having the numeral "3" and consecutive succeeding numerals indicating the location of the third and succeeding beats, whereby any selected one of the notations on the slide may be aligned with any selected one of the notations on the fixed part.

2. A device for determining the location of the beats in a measure of music comprising a fixed member carrying a set of lines of musical notations of different possible rhythmic patterns for part of a measure, each of the notations having indicia in consecutive order at the points where the beats are located, and a movable member arranged to slide longitudinally of and adjacent the fixed member, and means associated with the fixed member for slidably supporting the movable member, said movable member carrying a similar set of musical notations of rhythmic patterns for the remainder of the measure, each of the notations having indicia in consecutive order to the indicia on the fixed member at the points where the succeeding beats of the measure are located, whereby any common measure may be matched on the device by aligning a corresponding selected notation on the fixed member constituting a matching fraction of the measure with a selected corresponding notation on the movable member, the indicia of the aligned notations indicating the location of the beats in said measure.

3. A device for determining the beats in a measure of music comprising a fixed member carrying a set of rhythmic notations for parts of a number of possible rhythmic patterns in the left hand parts of measures, indicia locating the beats of said notations, and a slide associated with the fixed member and carrying similar notations and indicia for the remaining right hand parts of the measures.

4. A beat determining device according to claim 3, the notations on each of the members being for half of a measure, the indicia on the fixed member being the numerals "1" and "2" and on the slide being the next consecutive numerals "3" and "4."

5. The beat determining device of claim 4, the first notes of said notations on the fixed member being arranged in a column in vertical alignment with each other and the first notes of the notations of the slide being arranged in another column in vertical alignment with each other.

6. The beat determining device of claim 3, a sliding indicator mounted for longitudinal movement on the fixed member and having a window through which a line of notations on the fixed member and the slide is visible, and an arm pivoted to an end part of the indicator and extensible to a position beyond and perpendicular to the fixed member and foldable to a position on and parallel to the fixed member.

7. A beat determining slide rule comprising a tubular fixed member having a pair of transversely spaced top flanges connected by a transparent member, a vertical column of rhythmic musical notations on one of the flanges, each of the notations constituting part of a measure and each being marked with numerical indicia indicating the beat locations, a slide of substantially the width of the tubular member slidable within said fixed member and having a portion thereof exposed at the space between said top flanges, and a substantially identical column of musical notations marked with numerical indicia on said portion.

8. The beat determining slide rule of claim 7, the indicia on the notations of the fixed member comprising the numerals "1" and "2" and the indicia on the slide comprising the numerals "3" and "4."

9. The slide rule of claim 8, and a sliding indicator in the form of a tube encompassing the fixed member and slidable thereon and having a window therein.

10. A beat determining slide rule comprising a fixed member carrying a column of transverse lines of rhythmic musical notations for a half measure, each notation being marked with the numbers "1" and "2" indicating the location of the first and second beats, a slide carrying a column of transverse lines of rhythmic notations identical with the notations on the fixed member and each marked with the numbers "3" and "4" indicating the location of the third and fourth beats, and means slidably connecting the member and the slide for longitudinal movement only relatively to each other thereby to permit the alignment of any line of notations on the slide with any line of notations on the fixed member to arrange the numbers in numerical order and thereby to locate the four beats of an entire measure.

11. The slide rule of claim 10 and a sliding indicator on the fixed member having a transparent part provided with a transverse guide line and exposing the adjacent lines of notations on the fixed member and the slide.

12. The slide rule of claim 11 and an indicator arm having a window therein and pivoted to an end part of the sliding indicator and movable to an extended position perpendicular to the fixed member and to a folded position parallel to the fixed member.

13. A beat determining slide rule comprising a tubular member having a longitudinal opening throughout one side thereof, a slide within the member and of greater length than that of the member and having a portion thereof exposed at the opening, a column of rhythmic musical notations for part of a measure arranged on the tubular member adjacent the opening, each of the notations being marked with numerals locating the successive beats therein, and a second column of rhythmic notations on the slide for the remaining part of the measure, each of the notations being marked with numerals locating the remaining successive beats of the measure.

14. The slide rule of claim 13 and an arm having a window therein pivoted to and movable as a unit with a sliding indicator, and a sliding indicator of tubular form encompassing the tubular member and supporting the arm.

15. The slide rule of claim 14 and stops on the indicator limiting the movement of the arm beyond two predetermined positions.

16. A slide rule having two associated relatively slidable parts, each of the parts carrying a plurality of parallel transversely arranged lines of musical notations each having numbers thereon locating the beats of the parts of the measures denoted by said notations in consecutive order.

17. The slide rule of claim 16, a windowed sliding indicator carrying a guide line and slidable on one of the parts, an arm pivotally mounted on the indicator and extendable to a position parallel to the lines of notations and foldable to a position perpendicular to said lines, and stops limiting the movement of the arm beyond each of said positions.

LOUIS A. RUBEN.

No references cited.